United States Patent Office 3,326,931
Patented June 20, 1967

3,326,931
CERTAIN TRICHLOROMETHYL-SUBSTITUTED OXADIAZOLES AND OXADIAZOLINONES
Venkatachala L. Narayanan, Highland Park, and Jack Bernstein, New Brunswick, N.J., assignors to Olin Mathieson Chemical Corporation, New York, N.Y., a corporation of Virginia
No Drawing. Filed Aug. 12, 1965, Ser. No. 479,282
9 Claims. (Cl. 260—307)

This invention relates to new oxidiazoles and oxadiazolinones. These new compounds can be represented by the formulae

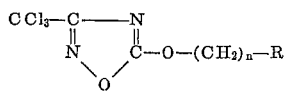

and

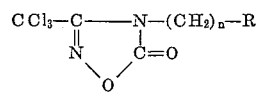

wherein $n$ is a positive integer less than eleven, and R is cyano, carboxy or carbalkoxy [preferably carbo (lower alkoxy)], the preferred compounds being those wherein $n$ is two or three.

These new compounds are useful as soil fungicides, in that when mixed into the soil at a concentration of about 50 p.p.m. they protect seeds and plants against a broad spectrum of pathogenic fungi, like species of the fungal genera Pythium, Fusarium, Rhizoctonia and Sclerotium. Moreover, since they are less volatile than the corresponding thio derivatives (i.e., the thiadiazoles and thiadiazolinones) they retain their antifungal activity after being mixed with soil longer than do said thio derivatives.

The compounds of this invention are prepared in mixture by a two-step process of this invention. In the first step, O-ethoxycarbonyltrichloroacetamidoxime is heated to yield 3-trichloromethyl-$\Delta^2$-1,2,4-oxadiazolin-5-one, a new intermediate of this invention. The resulting 3-trichloromethyl-$\Delta^2$-1,2,4-oxadiazolin-5-one is then treated with a compound of the formula

wherein $n$ and R are as hereinbefore defined and X is bromo or preferably iodo to yield a mixture of the final products; the reaction preferably being carried out in the presence of silver oxide. The resulting mixture can then be separated by vapor phase chromatography.

The following examples illustrate the invention (all temperatures being in centigrade).

EXAMPLE 1

*5-ethoxy-3-trichloromethyl-1,2,4-oxadiazole and 4-ethyl-3-trichloromethyl-$\Delta^2$-1,2,4-oxadiazolin-5-one*

Preparation of 3-trichloromethyl-$\Delta^2$-1,2,4-oxadiazolin-5-one.—A solution of 72.3 g. of trichloroacetonitrile in 100 ml. of anhydrous ether is added dropwise with stirring at a temperature of 5–10° to a suspension of 16.5 g. of hydroxylamine in 1.5 l. of anhydrous ether (addition time 1.5 hour). Stirring at 5–10° is continued for an additional hour. The mixture is then transferred to a separatory funnel and washed with 25 ml. of ice cold water. The clear ethereal solution is dried over anhydrous MgSO$_4$. Evaporation of the ether gives 67.5 g. of a yellowish white solid, M.P. 115–119°. It is crystallized from a 1:1 mixture of benzene and hexane to give 52.5 g. (59%) of 2,2,2-trichloroacetamidoxime as shiny white crystals, M.P. 125°.

A stirred mixture of 8.9 g. of 2,2,2-trichloroacetamidoxime and 7.5 ml. of ethylchloroformate is placed in an oil bath and its temperature raised slowly during 30 minutes to 75°. At 75°, the reaction mixture (half solid, half liquid) is removed from the oil bath and stirred for 15 minutes. The exothermic reaction (temperature rising to 85°) subsides during this time. The mixture is again heated to 80–90° for an additional 15 minutes, and subsequently allowed to cool. The addition of 30 ml. of dry ether results in the precipitation of trichloroacetamidoxime hydrochloride which is filtered off and washed with anhydrous ether. The ether solutions are combined, washed with water (30 ml.) and dried over MgSO$_4$. Slow evaporation of ether gives 5.2 g. (43%) of white crystals, M.P. 95–102°. These crystals are O-ethoxycarbonyltrichloroacetamidoxime.

24.95 g. of O-ethoxycarbonyltrichloroacetamidoxime is pyrolyzed at 160° (pre-heated oil bath) for 45 minutes. On cooling, a yellow thick oil is obtained which solidifies on the addition of hexane and scratching, 19.2 g., M.P. 103–125°. Two crystallizations from a mixture of chloroform and hexane gives about 8.5 g. (41%) of white crystals of 3-trichloromethyl-$\Delta^2$-1,2,4-oxadiazolin-5-one, M.P. about 129–131°.

*Analysis.*—Calc'd. for C$_3$HO$_2$N$_2$Cl$_3$: C, 17.71; H, 0.50; N, 13.76; Cl, 52.27. Found: C, 18.18; H, 0.82; N, 13.25; Cl, 51.30.

EXAMPLE 2

*5-(2-cyanoethoxy)-3-trichloromethyl-1,2,4-oxadiazole and 4-(2-cyanoethyl)-3-trichloromethyl-$\Delta^2$-1,2,4-oxadiazolin-5-one*

(a) *Preparation of β-iodopropionitrile.*—A solution of 32.0 g. of freshly distilled β-bromopropionitrile (64–66°/5 mm.) and 66.0 g. of sodium iodide in 400 ml. of dry acetone is stirred at room temperature for 20 hours. Evaporation of the solvent and washing with sodium thiosulfate solution gives an oil which when fractionally distilled yields 40.6 g. of β-iodopropionitrile, B.P. 101–103°/23–25 mm.

(b) *Preparation of a mixture of 5-(2-cyanoethoxy)-3-trichloromethyl-1,2,4-oxadiazole and 4-(2-cyanoethyl)-3-trichloromethyl-$\Delta^2$-1,2,4-oxadiazolin-5-one.*—To a mixture of 20.3 g. of 3-trichloromethyl-$\Delta^2$-1,2,4-oxadiazolin-5-one and 23 g. of silver oxide, 17.4 g. of β-iodopropionitrile is added slowly with strong cooling. The mixture is then heated to 70–75° with stirring for 2 hours. The solid is filtered off and the unreacted β-iodopropionitrile is removed in vacuo giving an isomeric mixture of 5-(2-cyanoethoxy)-3-trichloromethyl-1,2,4-oxadiazole and 4-(2-cyanoethyl)-3-trichloromethyl-$\Delta^2$-1,2,4-oxadiazoline-5-one.

(c) *Separation.*—By preparative gas chromatography on K–22A Column, the above mixture obtained in step (b) is separated into its pure components.

EXAMPLE 3

*5-(2-carboxyethoxy)-3-trichloromethyl-1,2,4-oxadiazole*

To 12.5 g. of 5-(2-cyanoethoxy)-3-trichloromethyl-1,2,4-oxadiazole, 60 ml. of concentrated hydrochloric acid is added cautiously with stirring. The mixture is heated at 70–80° for 6 hours. Water is added after cooling, and the mixture is extracted with ether. The ether solution is extracted repeatedly with 10% sodium carbonate solution. The combined sodium carbonate extracts are acidified and extracted with ether. The ether solution is evaporated leaving 5-(2-carboxyethoxy)-3-trichloromethyl-1,2,4-oxadiazole. It may be crystallized from benzene-petroleum ether.

EXAMPLE 4

*4-(2-carboxyethyl)-3-trichloromethyl-Δ²-1,2,4-oxadiazolin-5-one*

Similarly, by following Example 3, but substituting 4-(2-cyanoethyl)-3-trichloromethyl-Δ²-1,2,4 - oxadiazoline - 5-one for 5-(2-cyanoethoxy)-3-trichloromethyl-1,2,4-oxadiazole, 4-(2-carboxyethyl) - 3 - trichloromethyl - Δ² - 1,2,4-oxadiazolin-5-one is obtained.

EXAMPLE 5

*5-(2-carbethoxyethoxy)-3-trichloromethyl-1,2,4-oxadiazole*

A mixture of 25.6 g. of 5-(2-cyanoethoxy)-3-trichloromethyl-1,2,4-oxadiazole, 75 ml. of 95% alcohol and 3 cc. of water is poured into a citrate bottle and saturated with hydrogen chloride at 0–5°. After 12 hours at room temperature, the mixture is heated for 2 hours on the steam bath, cooled, 50 ml. of water added, the oily layer separated, and added to the ether extract of the aqueous layer. The ethereal solution is dried over anhydrous magnesium sulfate. The solvent is removed and the oily liquid distilled in vacuo to yield 5-(2 - carbethoxyethoxy) - 3 - trichloromethyl-1,2,4-oxadiazole.

EXAMPLE 6

*4-(2-carbethoxyethyl)-3-trichloromethyl-Δ²-1,2,4-oxadiazolin-5-one*

Similarly, by following Example 5, but substituting 4-(2-cyanoethyl) - 3 - trichloromethyl - Δ² - 1,2,4 - oxadiazoline-5-one for 5-(2-cyanoethoxy) - 3 - trichloromethyl-1,2,4 - oxadiazole, 4 - (2 - carbethoxyethyl) - 3 - trichloromethyl-Δ²-1,2,4-oxadiazolin-5-one is obtained.

The invention may be variously otherwise embodied within the scope of the appended claims.

What is claimed is:

1. A compound of the formula

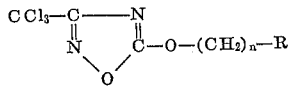

wherein $n$ is a positive integer less than eleven, and R is selected from the group consisting of cyano, carboxy, and carbo(lower alkoxy).

2. 5-(2-cyanoethoxy)-3-trichloromethyl - 1,2,4 - oxadiazole.

3. 5-(2-carboxyethoxy)-3-trichloromethyl-1,2,4 - oxadiazole.

4. 5-[2-carbo(lower alkoxy)ethoxy]-3-trichloromethyl-1,2,4-oxadiazole.

5. A compound of the formula

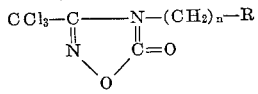

wherein $n$ is a positive integer less than eleven, and R is selected from the group consisting of cyano, carboxy, and carbo(lower alkoxy).

6. 4-(2-cyanoethyl) - 3 - trichloromethyl - Δ² - 1,2,4-oxadiazolin-5-one.

7. 4-(2-carboxyethyl) - 3 - trichloromethyl - Δ² - 1,2,4-oxidazolin-5-one.

8. 4-[2-carbo(lower alkoxy)ethyl]-3 - trichloromethyl-Δ²-1,2,4-oxadiazolin-5-one.

9. 3-trichloromethyl-Δ²-1,2,4-oxadiazolin-5-one.

References Cited

UNITED STATES PATENTS 3,202,673    8/1965    Metivier et al. _____ 260—307.1

FOREIGN PATENTS 1,339,238    8/1963    France.

OTHER REFERENCES

D'Alo et al., Chem. Abstracts, vol. 60 (1964), col. 6836.

Moussebois et al., Helv. Chim. Acta, vol. 47 (1964), pp. 838–48.

Wiley, Heterocyclic Compounds, Interscience, 1962, p. 256.

ALEX MAZEL, *Primary Examiner.*

RICHARD J. GALLAGHER, *Assistant Examiner.*